United States Patent
Erler et al.

(10) Patent No.: US 11,068,456 B2
(45) Date of Patent: Jul. 20, 2021

(54) LEVEL-BASED HIERARCHIES

(71) Applicant: SAP SE, Walldorf (DE)

(72) Inventors: Bastian Erler, Ludwigshafen am Rhein (DE); Gerald Franz, Wiesloch (DE); Hannes Jakschitsch, Mannheim (DE); Roland Sedler, Dossenheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/713,689

(22) Filed: Dec. 13, 2019

(65) Prior Publication Data

US 2021/0182259 A1      Jun. 17, 2021

(51) Int. Cl.
*G06F 16/22* (2019.01)
*G06F 16/26* (2019.01)
*G06F 16/25* (2019.01)

(52) U.S. Cl.
CPC ...... *G06F 16/2246* (2019.01); *G06F 16/2282* (2019.01); *G06F 16/258* (2019.01); *G06F 16/26* (2019.01)

(58) Field of Classification Search
CPC .................................................. G06F 16/2246
See application file for complete search history.

(56) References Cited

U.S. PATENT DOCUMENTS

| | | | |
|---|---|---|---|
| 2005/0192986 A1* | 9/2005 | Butler | G06F 16/288 |
| 2006/0085440 A1* | 4/2006 | Jandhyala | G06F 16/10 |
| 2010/0229150 A1* | 9/2010 | Stone | G06F 8/00 |
| | | | 717/104 |
| 2016/0063043 A1* | 3/2016 | Carroll | G06F 16/282 |
| | | | 707/797 |

* cited by examiner

*Primary Examiner* — Roland J Casillas
(74) *Attorney, Agent, or Firm* — Sterne, Kessler, Goldstein & Fox P.L.L.C.

(57) ABSTRACT

Disclosed herein are system, method, and computer program product embodiments for the translation of a level based format, where each record contains a complete individual path from the highest to the lowest leaf level, to an annotated hierarchy through a generator function which through mapping and encoding on a level-by-level basis, keeping track of sibling links, is able to perform a depth-first pre-ranking order assessment of original data, to produce an annotated hierarchy which may be utilized by a user.

20 Claims, 9 Drawing Sheets

Source Table 301

| Row Number | LevelCol1 | LevelCol2 | LevelCol3 |
|---|---|---|---|
| 0 | Level11 | Level21 | Level31 |
| 1 | Level11 | Level21 | Level32 |
| 2 | Level11 | Level22 | Level33 |
| 3 | Level12 | NULL | Level32 |
| 4 | Level12 | Level22 | Level31 |
| 5 | Level12 | Level23 | NULL |
| 6 | Level13 | NULL | Level33 |
| 7 | Level13 | NULL | Level34 |

301a, 301b, 301b, 301c

Encoded Table 303

| Row Number | Encoded LevelCol1 | Encoded LevelCol2 | Encoded LevelCol3 |
|---|---|---|---|
| 0 | 0 | 0 | 0 |
| 1 | 0 | 0 | 1 |
| 2 | 0 | 1 | 2 |
| 3 | 1 | 2 | 3 |
| 4 | 1 | 3 | 4 |
| 5 | 1 | 4 | 5 |
| 6 | 2 | 5 | 6 |
| 7 | 2 | 5 | 7 |

303a, 303b, 303c, 303d

Encoded Col 2 Siblings 305

| Encoded LevelCol2 | Next Sibling in Row |
|---|---|
| 0 | 2 |
| 1 | 0 |
| 2 | 4 |
| 3 | 5 |
| 4 | 0 |
| 5 | 0 |

305a, 305b

Encoded Col 3 Siblings 307

| Encoded LevelCol3 | Next Sibling in Row |
|---|---|
| 0 | 1 |
| 1 | 0 |
| 2 | 0 |
| 3 | 0 |
| 4 | 0 |
| 5 | 0 |
| 6 | 7 |
| 7 | 0 |

LEVEL-BASED HIERARCHIES

BACKGROUND

In the present day and age, an ever increasing amount of organizations have to store immense amounts of data in the form of databases to access for use during daily business operations. With the advent of the internet, cloud computing, and other such technological advances, content tends to be fragmented across applications and systems, and the amount of data accessed from such databases has increased over time in an exponential manner.

Certain types of these data may be represented through hierarchical models to define the structure or logical design of a database, as a mode of storage. One example of such a hierarchical model is a parent-child hierarchy. In a parent-child hierarchy, for example, a source data table for such a hierarchy may be made with two columns, "parent" and "child," and a plurality of rows, wherein entries in these two columns for each respective row represent a connection between a parent node and a child node. Then, the table may be parsed and a tree may be constructed representing the connections between each parent node and child node, to make the annotated hierarchy. For example, in a hierarchy that represents an organizational structure, a manager level may be a parent level, while an employee level may be a child level, and the managers and employees, respectively, may be written into different columns of a source data table from which a hierarchy is made. This same concept could be used across multiple-levels to represent an entire organization chart. A CEO, for example, may be at the top level of the hierarchy, and may be the parent node of the executive secretary and the chief operating officer. The chief operating officer may be the parent node for other staff, while the executive secretary may not be, etc, and so on and so forth. In this manner, a hierarchy may be constructed from source-data inputted as a parent-child table, wherein several levels of parent-node relationships, may be represented. Additional forms of source tables may be used. For example, there may be additional columns to the parent-child table defining the validity interval (start, finish) of a parent-child relationship, representing wherein an employee may have different managers at different points in time.

There are a number of advantages of having such an annotated hierarchy. Because traversal may be made recursively, for example by calling a pre-order function, such trees provide very efficient insertion, searching, and traversal techniques. In the organization example used above, to see members of the organization below a node (e.g. the chief operating officer), only that node needs to be called, wherein it is directly or indirectly connected to all nodes below it, which can simply be read from the structure itself. This is opposed to other forms of storage where each entry needs to be checked to see if it falls below a certain node. In the same manner, subtrees in such a hierarchy may be moved with minimum effort, and are very flexible forms of data. Because all linkages below a node are intact, only one linkage needs to be re-assigned, to re-assign the entire subtree.

However, for certain formats, it is hard to translate these to generate such an annotated hierarchy structure. One such format is a level-based format. In a level-based table format, each row typically represents an entire path from a root to a leaf node. A typical use case may be customer information when ordering. In this case, a level-based format may be used to store address data where each record may consist of a country, state, city, street, and street number for a customer. Therefore each record may also be interpreted as part of a geographical hierarchy. The entire path from the root to the leaf node needs to be represented because often two different geographical entities such as cities, etc., may have the same name, and without a full path present, may be confused with each other. Because each row represents multiple levels, wherein each level may be a new column, to keep column sizes relatively short hierarchies are not typically very deep, and are typically less than 10 levels. Additionally, because of much of the same information being re-represented across rows (e.g. for two different leaf nodes, at the bottom of the tree, they may have the exact same path to the top of the tree, which is repeated in both rows), this format contains a lot of redundant information which lends itself well to compression.

However, it is difficult to go from this format to a format of an annotated hierarchy as described above. In particular, without a way to do so, it is difficult to keep track of links between sibling nodes, and computing a hierarchy.

BRIEF DESCRIPTION OF THE DRAWINGS

The accompanying drawings are incorporated herein and form a part of the specification.

FIG. 3 is a table showing an original source table, and the table in its encoded version, along with encoded columns and their sibling nodes, according to some embodiments.

FIG. 5 shows a dynamic view of an example results table as it undergoes the process shown in the flow chart of FIG. 4.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for the production of annotated hierarchies from source data in a level-based format.

Figure 1:
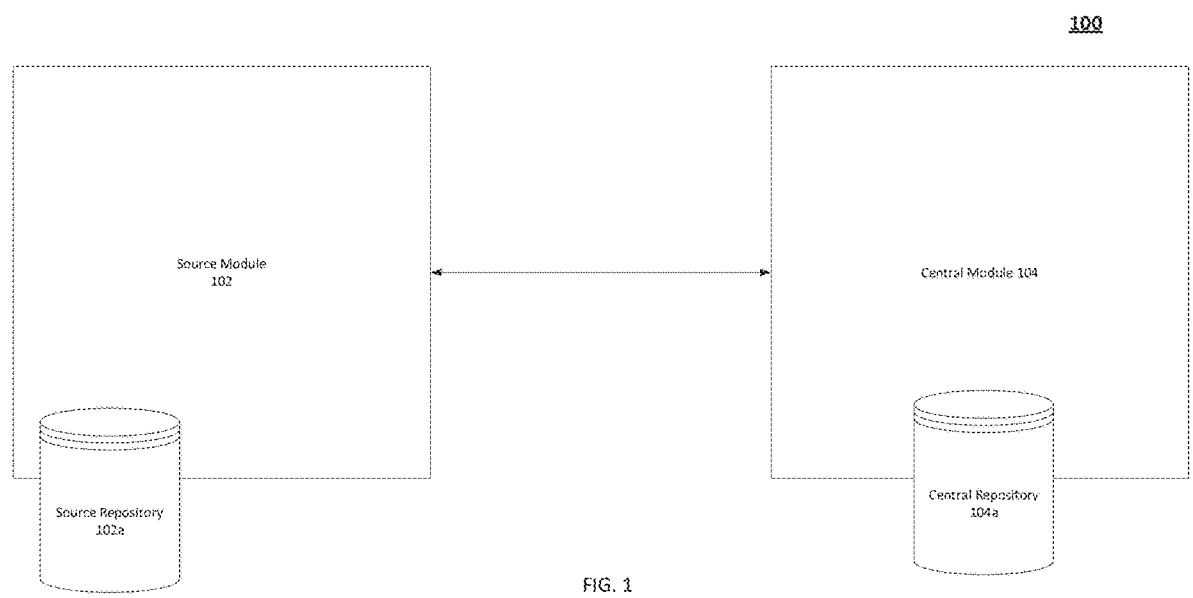
FIG. 1 is a block diagram of the interaction between a source module with a database and a central module, according to some embodiments.
Figure 9:
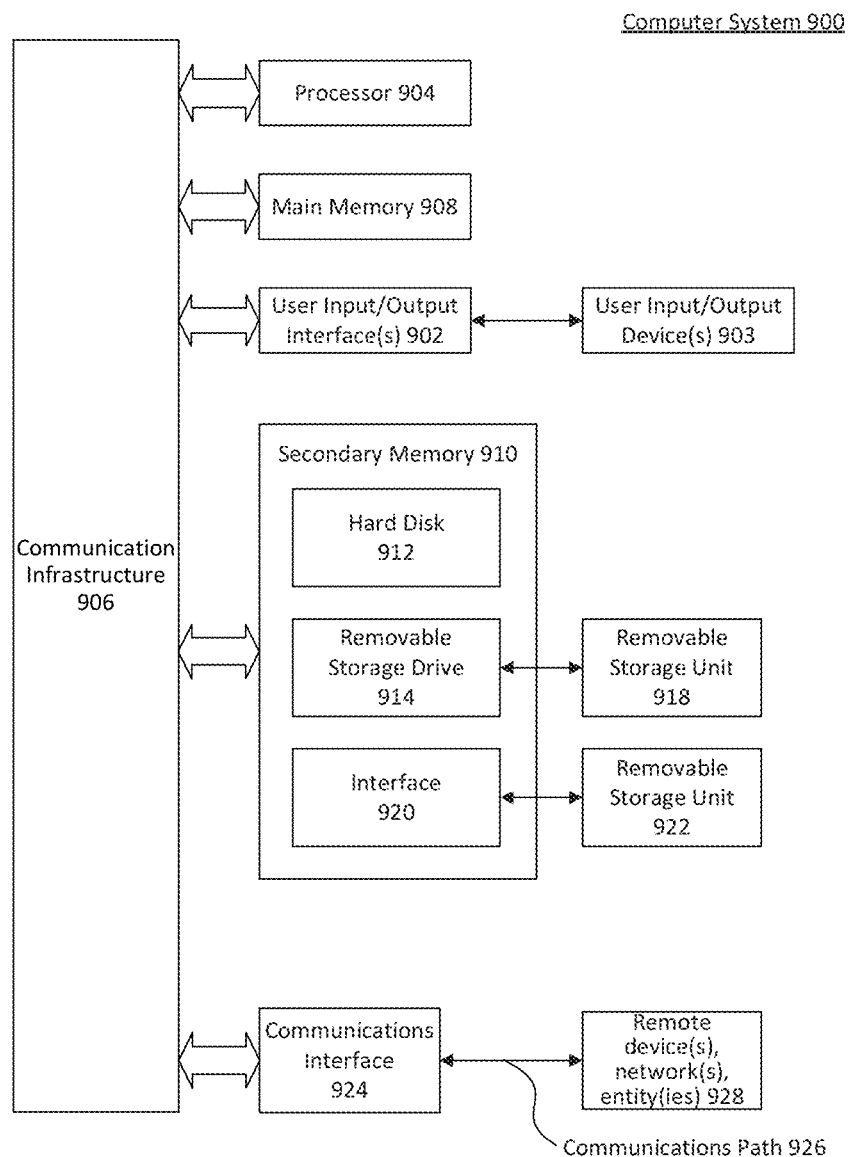
FIG. 9 is an example computer system useful for implementing various embodiments.

FIG. 1 is a block diagram of a data-transfer environment 100 showing the interaction between a source module 102, which includes a source repository 102a, with a central module 104, which includes a central module repository 104a. The user of the source module, using the disclosed embodiments, may be able to receive a hierarchy produced by the central module 104, operating on data from the source repository 102a in the form of a level-based source data table. The central module 104 produces an encoded source table, and a results table, which may be stored in the central repository 104a, from which the hierarchy may be then created, and displayed back to the user on the source module 102. According to an embodiment, the central module 104 and the source module 102 may comprise one or more separate computer systems such as the computer system 900, as shown in FIG. 9 and will be explained later. According to an embodiment, the source module repository 102a may itself comprise one or more separate computer systems such as the computer system 900, or the source module repository 102a may be present on an existing computer system 900 of the source module 102.

To aid in describing the methods of FIG. 2 and FIG. 4 that follow, an example embodiment of the underlying structure will first be described. The underlying structure of a computer system 900, shown in FIG. 9, can implement a database and the sending and receiving of data. Such a computer system, may, according to the embodiments describe above, include source module 102, source module repository 102a, and central module 104. Computer system 900 may include one or more processors (also called central processing units, or CPUs), such as a processor 904. Processor 904 may be connected to a communication infrastructure or bus 906.

Computer system 900 may be virtualized, or it may also include user input/output devices 903, such as monitors, keyboards, pointing devices, etc., which may communicate with communication infrastructure 1006 through user input/output interface(s) 902.

One or more processors 904 may be a graphics processing unit (GPU). In an embodiment, a GPU may be a processor that is a specialized electronic circuit designed to process table data received from the source module repository 102a when data is to be processed in a mass quantity, making it particularly effective in resource-intensive applications to translate level-based source data tables to hierarchies. In addition, such a GPU may be used in user operations on the outputted hierarchy, such as filtering, searching for nodes present under a specific node, etc. The GPU may have a parallel structure that is efficient for parallel processing of large blocks of data, such as mathematically intensive data common to computer graphics applications, images, videos, word-processing documents, PDF files, and the like, any of which can include table data received from source module repository 102a as described above.

Computer system 900 can also include a main or primary memory 908, such as random access memory (RAM). Main memory 908 can include one or more levels of cache (including secondary cache), which may be used for caching operations for the hierarchy, as will be described later.

Computer system 900 can also include one or more secondary storage devices or memory 910. Secondary memory 910 may include, for example, a hard disk drive 912 and/or a removable storage device or drive 914, which may interact with a Raid array 916, which may combine multiple physical hard disk drive components (such as SSD or SATA-based disk drives) into one or more logical units, or a removable storage unit 918. Removable storage unit 918 may include a computer usable or readable storage device having stored thereon computer software (control logic) and/or data, including remotely accessed network drives. Removable storage unit 918 may also be a program cartridge and cartridge interface, a removable memory chip (such as EPROM or PROM) and associated socket, a memory stick and USB port, a memory card and associate memory card slot, and/or any other removable storage unit and associated interface. Removable storage drive 914 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 may enable computer system 900 to communicate and interact with any combination of external devices, external networks, external entities, etc. (individually and collectively referenced by reference number 928). For example, communication interface 924 may allow computer system 900 to communicate with external or remote entities 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Any applicable output data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), Structured Query Language (SQL), or any other functionally similar representations alone or in combination, and may be used for sending or receiving data (e.g. between any of the source module 102, the source repository 102a, the central module 102, and the central repository 104a in FIG. 1). Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), may cause such data processing devices to operate as described herein.

Computer system 900 may be a client or server, accessing or hosting any applications and/or data through any delivery paradigm, including but not limited to remote or distributed cloud computing solutions such as cloud computing environment 801 which will be explained infra; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

In implementing the source module repository 102a, or central module repository 104a, as an example approach, for storing and accessing its constituent data objects, the computer system 900 may use an in-memory database with persistence, which may store and access data objects from the primary memory 908 of the computer system 900 with a transaction log for persistence being stored in secondary memory 910. For the repository 102a, the computer system 900 may implement only part of the data as an in-memory database, using less primary memory 908 than as described above, to reduce the in-memory footprint, and may instead store a larger portion of the data as a disk-based database within the secondary memory 910, where the data may thus be stored in a tiered manner (more frequently accessed data is stored in primary memory 908 while less frequently accessed data is stored in secondary memory 910).

Alternately, the computer system may store none of the data in primary memory 908 or secondary memory 910, and the computer system 900 may write data to a separate file archive stored in the secondary memory (e.g., in a file on a hard drive in a Raid array 916, on an EPROM chip 920, or other type of secondary memory 910, etc).

Further, if the source module repository 102a is implemented as a separate system 900, it may send data through the communication or network interface 924, wherein the source module 102 and central module 104 may comprise entities 928 present on an internal or external network, which may be accessed through communications path 926. Alternately, if the source module 102 is present along with source module repository 102a jointly in a computer system 900, the computer system 900 may implement the database using the communication infrastructure 906 for communication between the source module repository 102a and the source module 102, but may send data to the central module 104 through the communications interface 924, through communications path 926, where central module 104 is a network entity 928. Similar sending of data may occur in an analogous manner with regards to the central module repository 104a, and the central module 104, depending on whether central module repository 104a is implemented as a separate system 900.

Figure 8:
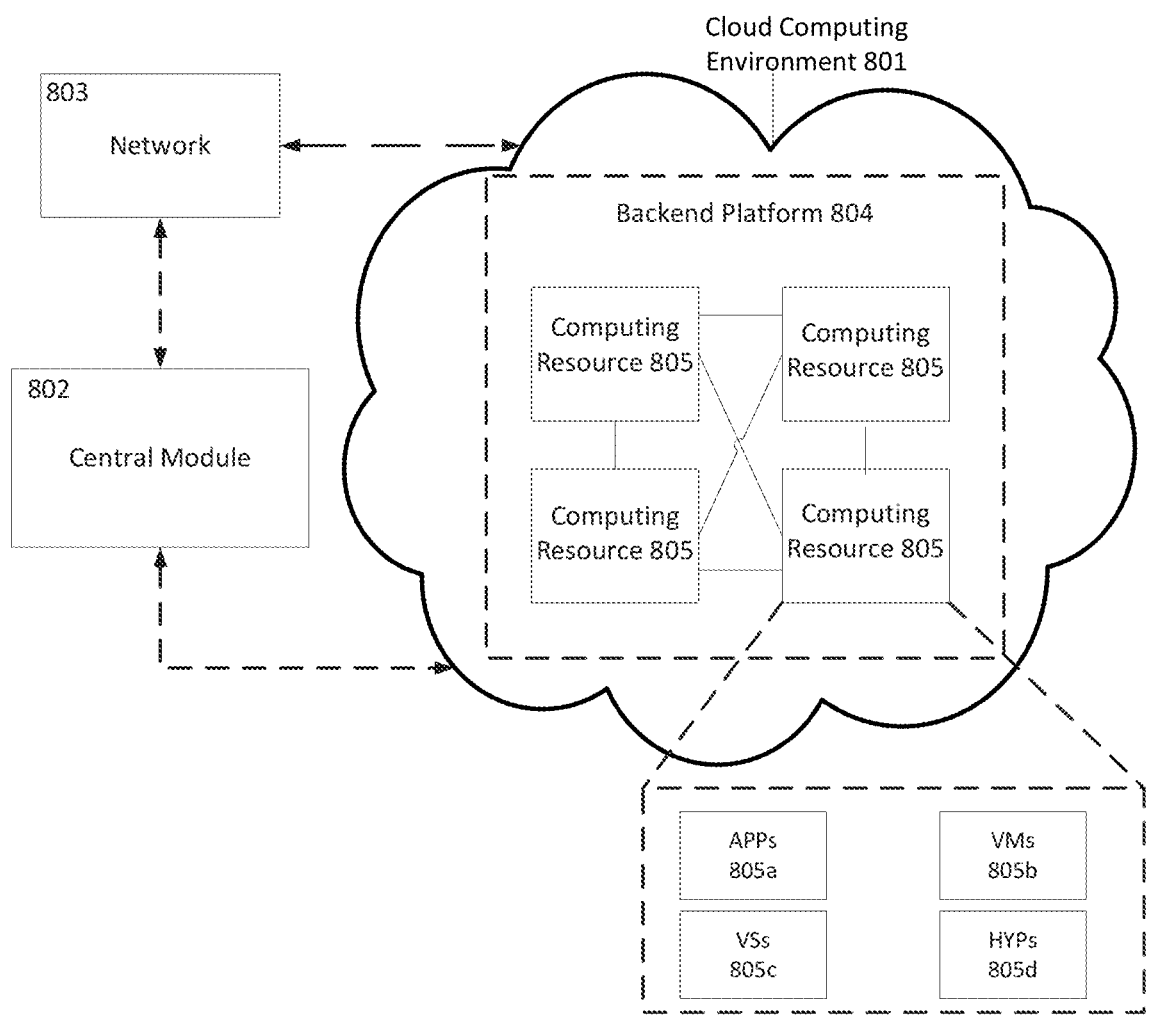
FIG. 8 is a block diagram of an example where a cloud computing environment may be accessed by a source module, according to some embodiments.

As shown in FIG. 8, cloud computing environment 801 may contain backend platform 804, in a block diagram of an example environment 800 in which systems and/or methods described herein may be implemented. The central module 104 of FIG. 1, described above, may also include a host such as cloud computing environment 801. The cloud computing environment 801 may be accessed by the central module computing system 802, of the same type of computing system 900 as described above. In this case, the central module computing system 802 of FIG. 9 may access the cloud computing environment 801 by a communication or network interface 824 as shown in FIG. 8, wherein a network gateway 803 may comprise a remote entity 928 accessed by the communications path 926 of the central module computing system (where the three entities 801, 802, and 803 shown in FIG. 8 would collectively correspond to the central module 102 of FIG. 1). Alternately, the computing cloud environment 801 itself may correspond to a remote entity 928 in FIG. 9, and may be accessed directly by the central module computing system 802 through a communications path 926, for example through an application protocol interface (API), eliminating the need for a network gateway 803 (both options are shown in FIG. 8, wherein the flow path above the central module computing system 802 uses a network gateway 803, and the flow path below the central module computing system 802 connects directly to the cloud computing environment 801, both shown using dashed bi-directional lines).

The devices of the environments 800 and 100 may be connected through wired connections, wireless connections, or a combination of wired and wireless connections.

In an example embodiment, one or more portions of the data transfer environment 100 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

As explained above, the central module 104 of FIG. 1 may have a central module computing system 802 as shown in FIG. 8 comprising a computer system of the same type as the computer system 900 as shown in FIG. 9. The source module 102 or source module repository 102a may access the central module 104 through the central module computing system 802, wherein the source module 102 or source module repository 102a may be external network entities 928 from the perspective of the central module computing system 802 in an embodiment, and may send data back and forth in the form of data packets through the communications path 926 of the communications interface 924 of system 802, using e.g., TCP/UDP/FTP/HTMLS protocol. Alternately, the source module may access the central module 104 through a front-end web-application application 805a (e.g. a web browser application, a web browser extension, proprietary OS application, standalone executable application, command line access shell program, FTP/UDP/TCP/HTMLS protocol, etc.) hosted as an application 805a on a computing resource 805 (explained infra) within the cloud computing environment 801 hosted by the central module 104, in an embodiment. Such an application may comprise a software as a service (SaaS) type offering, as described above.

The backend platform 804 in FIG. 8 may include a server or a group of servers. In an embodiment, the backend platform 804 may host a cloud computing environment 801. It may be appreciated that the backend platform 804 may not be cloud-based, or may be partially cloud-based.

The cloud computing environment 801 includes an environment that delivers computing as a service ("CaaS" as described above), whereby shared resources, services, etc. may be provided to the central module computing system 802 and/or the backend platform 804. The cloud computing environment 801 may provide computation, software, data access, storage, and/or other services that do not require end-user knowledge of a physical location and configuration of a system and/or a device that delivers the services. For example, the central module computing system 802, as well as source module 102 may receive data stored within or hosted on a database within computing resources 805 within the backend platform 804, through an application protocol interface (API) or any of the various communication protocols previously listed. The cloud computing environment 801 may include computing resources 805.

Each computing resource 805 includes one or more personal computers, workstations, computers, server devices, or other types of computation and/or communication devices of the type such as computer system 900 described above. The computing resource(s) 805 may host the backend platform 804. The cloud computing resources may include compute instances executing in the cloud computing resources 905. The cloud computing resources 905 may communicate with other cloud computing resources 905 via wired connections, wireless connections, or a combination of wired or wireless connections.

Computing resources 805 may include a group of cloud resources, such as one or more applications ("APPs") 805a, one or more virtual machines ("VMs") 805b, virtualized storage ("VS") 805c, and one or more hypervisors ("HYPs") 805d.

An application 805a may include one or more software applications that may be provided to or accessed by a computer system 900. In an embodiment, the central module 104 may only include a cloud computing environment 801 executing locally on a computer system 900 of the central module computing system 802. The application 805a may include software associated with backend platform 804 and/or any other software configured to be provided across the cloud computing environment 801 (e.g. to source module 102). The application 805a may send/receive information from one or more other applications 805a, via one or more of the virtual machines 805b. Computing resources 805 may be able to access each other's applications 805a through virtual machines 805b, in this manner. In an alternate embodiment, a separate central module computing system 802 is not needed, and the central module 104 only comprises the cloud computing environment 801, hosted and executed by computing resources 805, and communicating with the source module 102 via app 805a, using any of the various communication protocols mentioned above.

Virtual machine 805b may include a software implementation of a machine (e.g., a computer) that executes programs like a physical machine. This may be of particular use in the alternate embodiment where there is no separate central module computing system 802 of the type of computer system 900. In this embodiment, the central module computing system 802 may be a virtualized machine 805b, and may communicate with source module 102 using the various communication protocols listed above, via an application 805a. Virtual machine 905b may be either a system virtual machine or a process virtual machine. A system virtual machine may provide a complete system platform that supports execution of a complete operating system (OS). A process virtual machine may execute a single program and may support a single process. The virtual machine 805b may execute on behalf of a user (e.g., the administrator of the central module 104) and/or on behalf of one or more other backend platforms 804, and may manage infrastructure of cloud computing environment 801, such as data management, synchronization, or long duration data transfers, and accessing the source module repository 102a of a source module 102.

Virtualized storage 805c may include one or more storage systems and/or one or more devices that use virtualization techniques within the storage systems or devices of computing resource 805. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the central module 104 flexibility in how they manage storage for evaluation data from processing of data accessed from the source module repository 102a (as will be explained infra), as well as data reduction potential reports designated for different end users at the source module 102. File virtualization may eliminate dependencies between data accessed at a file level and location where files are physically stored. This manner of block and file virtualization may enable optimization of storage use, server consolidation, and/or performance of non-disruptive file migrations.

Hypervisor 805d may provide hardware virtualization techniques that allow multiple operations systems (e.g., "guest operating systems") to execute concurrently on a host computer, such as computing resource 805, which may include a computing system of the type of computing system 900, and can in this manner host a virtualized hardware of a central module computing system 802. Hypervisor 805d may present a virtual operating platform to the guest operating systems, and may manage multiple instances of a variety of operating systems as these "guest operating systems," which may share virtualized hardware resource, such as RAM, which may for instance access the data in the form of a database of the source module repository (102a in FIG. 1). Alternately, secondary memory may be accessed using virtualized storage 805c, or on physical storage, such as the hard disk drive 912, of a computing resource 805 of the type of computing system as computing system 900. In embodiments heretofore described, using a combination of RAM and secondary memory to access the database, such that a portion of the database may be in-memory and a portion of the database stored in files, is also envisioned, wherein source module 102 may also include an environment 800 with a cloud computing environment 801, instead of only a computing system of the type of computing system 900.

Figure 2:
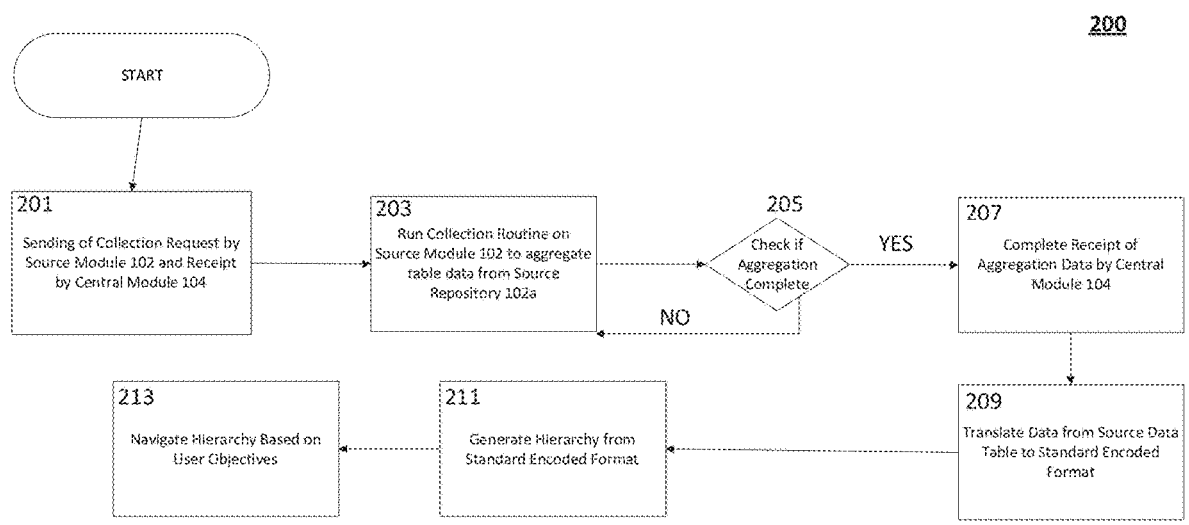
FIG. 2 is a flowchart illustrating a process for accessing a source module from a central module when triggered by a source module, collecting table data from the source module's database, generating a hierarchy from the data, and outputting results back to the source module, according to some embodiments.
Figure 4:
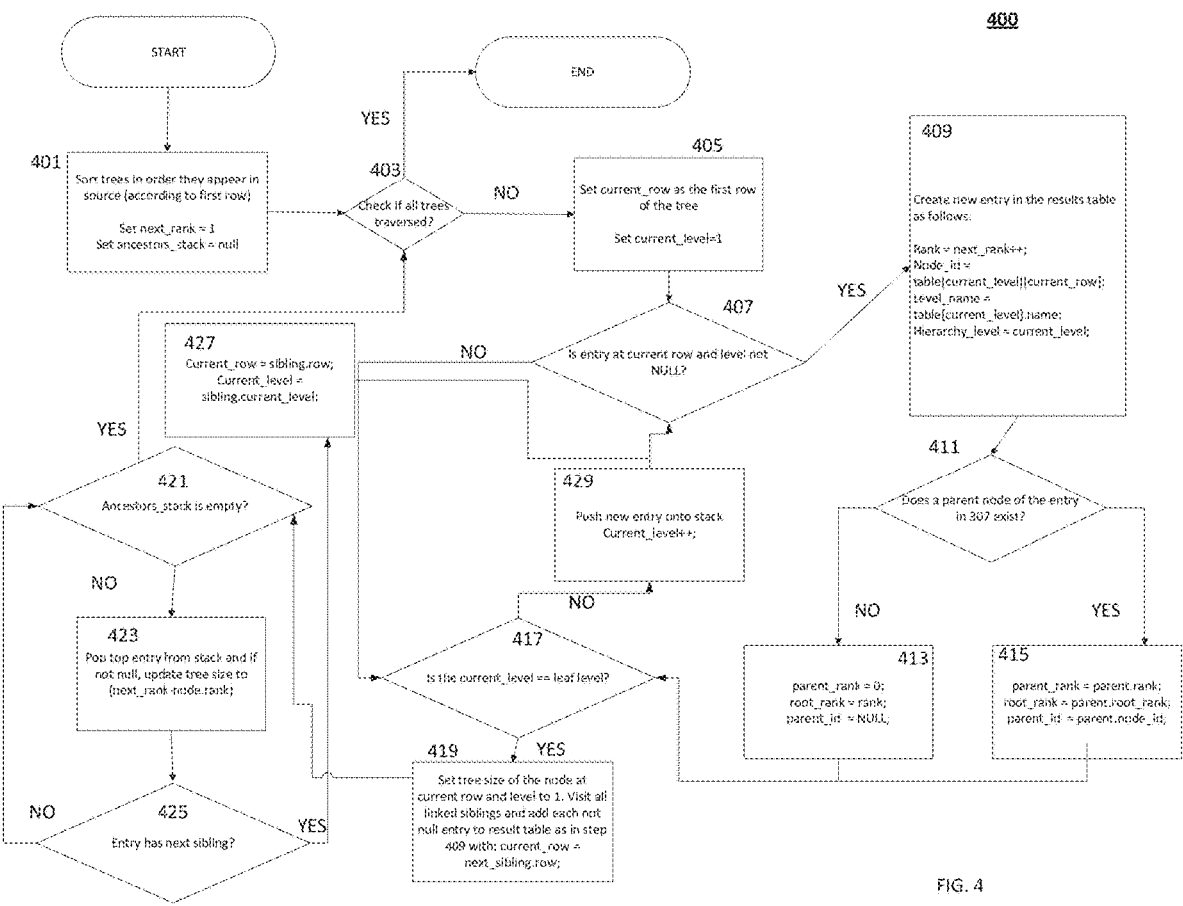
FIG. 4 is a flowchart illustrating a process for conducting a depth-first sort according to pre-order rank to create a hierarchy from the encoded source table, according to some embodiments
Figure 6:
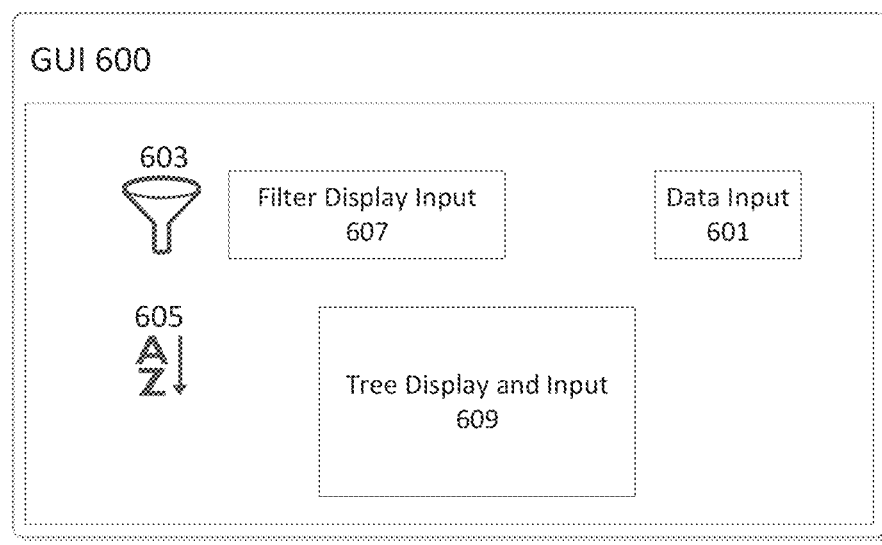
FIG. 6 is a graphic user interface (GUI) showing the display interface on a source module generated from a central module, and accessed by the source module, before and after tree generation, with various views and filters, according to some embodiments.

FIGS. 2 and 4 are flowcharts, wherein FIG. 2 describes an overall flow of an application, and FIG. 4 describes the specific portion regarding translation of a source level-based data table input into an annotated hierarchy. In this flow of the application, data stored in source module repository 102a of FIG. 1 is assessed by central module 102, a hierarchy is formulated based on the assessment, and may be reported back to the user of source module 102. Subsequently, the user may perform user operations to search or navigate the hierarchy. Both method 200 and 400 can each be performed by processing logic that can include hardware (e.g., circuitry, dedicated logic, programmable logic, microcode, etc.), virtualized hardware, software (e.g., instructions executing on a processing device), virtualized software, or a combination thereof as described above. It is to be appreciated that not all steps may be needed to perform the disclosure provided herein. Further, some of the steps may be performed simultaneously, or in a different order than shown in FIGS. 2 and 4, as will be understood by a person of ordinary skill in the art.

Method 200 shall be described with reference to FIGS. 1, 3, and 5-10, although method 200 is not limited to these embodiments. Although the steps of the method 200 are herein described such that the source module repository 102a of FIG. 1 is considered to be a part of the computing system 900 of FIG. 9 comprising the source module 102, the method may also be carried out analogously in the case that the source module repository 102a of FIG. 1 itself includes a separate computing system 900 of FIG. 9. In this case, communication between the central module 104 and source module 102 described in relevant steps of the method 200 would require further network communication between the source module 102 and source module repository 102a, such as by using communications path 926 of FIG. 9, as described above. The same reasoning applies to the method disclosed in FIG. 4, if the central module repository 104a of FIG. 1 itself includes a separate computing system 900 of FIG. 9.

According to an embodiment, at the start of the process of method 200, at step 201, the central module 102 in FIG. 1 is listening for requests from source module 102 for data collection from source module repository 102a. This may be continuously at a predetermined regular interval (for example, 0-100 milliseconds), or at an irregular interval. In an embodiment, a GUI 600 (see FIG. 6) may be displayed on a user input/output interface 902 of the source module 102, such as an external monitor. Through user input/output devices 903, or in an autonomous manner, the user may input a source to the data input 601 field of GUI 600. This may occur in a number of ways. For example, the data input 601 field may be a text-box, or a path selection dialogue box, wherein the user may input the file path, address, or link, such as an SQL SELECT statement, etc., to a level-based source data table in the source module repository 102a. Alternately, the request itself may generate the source data table to be analyzed, which may be through an SQL CREATE TABLE statement, or raw numeric input. Once the user has finished inputting into the data input 601 field a request may be sent from the source module 102 to the central module 104 for data collection from the source module repository 102a.

The table which is linked to or inputted must conform to certain specifications. In general, each entry must complete an individual path from the highest (root node) to the lowest (leaf) level (wherein levels in between may have NULL as an entry if levels are skipped). This may occur for example, in a geographical hierarchy, where there are city/states or special jurisdictions (e.g. the Vatican, etc.), where certain geographical fields such as city or state may not be present, and therefore may have a NULL value.

Entries in the table may be made row-by-row, on a row-wise basis. The columns in the table, for each row, may denote different levels of the hierarchy. The sequence of columns, from left-to-right, may determine their level. For example, the left-most column may be the root-node, the next column on the right may be the level below the root-node, etc.

In an embodiment, columns that denote levels may be specified in the input field 601. Additionally, in another embodiment, there may be a plurality of input boxes 601 on GUI 600, where on an additional input box 601, the information regarding which columns of the table are levels may be entered. When this is done, additional columns, which are not specified as levels, may specify properties or attributes of nodes of the level column to their immediate left.

For example, if the second and fifth columns of a six-column table were specified as levels, then the third and fourth columns of the table may describe attributes of the second column, the sixth column may describe attributes of the fifth column, and so-on. If levels are not specified, then all of the source data table columns may be treated as level columns defining a level. Nodes on different levels may be of any different data types, such as SQL data types, XML data types, or any of the other types described above. In an additional input box 601, in an embodiment, the sort order (ascending or descending), as well as a level to be sorted by (e.g. "postal code"), may be specified, to be applied for siblings of the same parent node in the to-be-generated hierarchy. In a further additional input box 601, in an embodiment the caching policy for the generated hierarchy may be specified. Caching may improve the performance for subsequent navigations by the user on the same hierarchy. A default option may be set to cache when the central module 104 assess the source to be reliably deterministic.

Additional options of "no cache" or "force cache" may also be offered, where if "force cache" is used then the generated hierarchy is cached even if the central module 104 does not assess the source to be reliably deterministic. Normally, when the central module assesses the source to be reliably deterministic, this means the central module determines that the source data table is reliably reproducible. In the embodiment of copying the source data table onto the central module repository 104a, reliable reproducibility may be better controlled and assured if adequate storage and processing resources are available.

Once the central module 104 receives such a request at step 201, this request triggers the process to move forward, wherein the central module 104 then executes a collection subroutine in step 203, on source module 102, to aggregate table data from data objects in the source module repository 102a. Such a collection subroutine may be present as executed instructions in various embodiments. For example, the collection subroutine may be executed from within primary or secondary memory of the central module computing system 802 in FIG. 8 by the processor of the system, wherein computing system 802 is part of central module 104 in FIG. 1. Alternatively, the collection subroutine may be executed as a backend application 805a of FIG. 8, executed on a computing resource 805 forming part of the backend platform 804 of a cloud computing environment 801 as previously described, wherein the cloud computing environment 801 is part of central module 102 in FIG. 1. In each embodiment, the data may be gathered in different ways as well. In one embodiment, only indexes of the table may be noted, with the table itself still present in the source module repository 102a. In another embodiment, where there may be more space available on the computing system 802 or resources 805 of a backend platform 804, the data table itself may be created in or copied to the central module repository 104a, and further operations may be then executed in a self-contained manner within the central module 104 itself. In this manner, faster operation can be conducted, and problems that may occur in communication between the central module 104 and system module 102 can be avoided.

The execution of the collection subroutine at step 203 will now be described in more detail. The information needed from the table inputted in field 601 (either indexes or the table itself based on the embodiments above) may be aggregated in a piecemeal manner (e.g. row-by-row or column-by-column), in multiple payloads, or at once, as a single pay-load. A multiple payload embodiment may be used when there is not much bandwidth over a network to be sent, or there the processing speed of the central module computing system 802 is slow, etc. On the other hand, when there is sufficient bandwidth available and/or there is high processing power on the central module computing system 802 or the use of several pooled resources 805 of a backend platform 804, a single payload embodiment may be used. A check may be made at regular intervals (e.g., 0-1000 milliseconds) on whether the aggregation process is complete. This occurs by the collection routine checking to see if additional data is present that has not been indexed or copied and there are still remaining portions of the table to be processed. If there are remaining portions of the table to be processed or additional data present ("NO" at step 203 in FIG. 2), then the collection routine returns to step 202 to run the collection subroutine on the table in source module repository 102*a* or otherwise inputted by the user.

If the process is complete, and no portions of the table remain to be processed ("YES" at step 205 in FIG. 2), the overall process proceeds to the next step, 207, wherein receipt of aggregated data is completed (otherwise, the process returns to 203). This data may be received by the central module 104 in step 207 using the communication pathway 926 of a computing system 900 of FIG. 9 formed by the source module 102 and/or source module repository 102*a*, wherein the central module 104 is a network entity 928 relative to the source module 102 computing system, wherein central module 104 may receive this data through communications path 926 of communications interface 924 of central module computing system 802 of FIG. 8 described above, using any of the various communication protocols described above. Alternatively, central module 104 may receive this data through a communications path 926 of a computing system of the form of system 900 of FIG. 9 comprising a computing resource 805 of the cloud environment 801, using any of the various communication protocols described, and/or in the form of a running application 805*a*.

At step 209, the central module, through a level-based-hierarchy generator function, first creates an encoded table from the data received from the source level-based data table. An example source data table 301 is shown in FIG. 3. First a dictionary is built for the values in the (leftmost) top-level column. In order to do this, each different value in the top-level column may be mapped to the next free integer value starting with zero. For example, the first three rows of the top-level column all have the same value ("Level11"), and are thus mapped to the same encoded value of 0. The next three rows (3-6) all have the same value ("Level12"), and are thus mapped to the same encoded value of 1. Finally, the last two rows (6-7) have the same value of ("Level13"), and are thus mapped to the same encoded value of 2. The result of this process is shown in "Encoded LevelCol1" 303*b* in Encoded Table 303.

Then, the lower level columns may be encoded at a level $L_i$ by taking into account the encoded values at the next higher level $L_{(i-1)}$ and the values in $L_i$. For example, the second column 301*b* of the source table 301 may be encoded wherein each different pair (encoded parent value and node value) is mapped to the next free integer value starting with zero. For example, since both the first and second row in table 301 have an encoded parent value of 0, and a node value of "Level21," both of these values may be encoded as 0. Using similar reasoning, row number 2 in table 301 (encoded parent value 0, node value "Level22") may be mapped to encoded value 1 for the second column, row number 3 (encoded value 1, node value NULL) may be mapped to encoded value 2, row number 4 (encoded value 1, node value "Level22") may be mapped to 3, row number 5 (encoded value 1, node value "Level 23") may be mapped to 4, and rows 6 and 7 (encoded value 3, node value NULL) may be mapped to 5. This result is reflected in column 303*c* of Encoded Table 303, showing Encoded LevelCol2, representing the encoded second column. The same process is then applied to the encoded value of column 2, and the node values of column 3 in column 301*c*. The resulting encoded column is shown in column 301*d* of Encoded Table 303. Thus a completely encoded table, where the values have been mapped to integers, and each column's encoded values have been used in an iterative manner in combination with the next column's node values to generate the next column's encoded values.

In addition, for encoding the lower level columns after the first column has been encoded, for each node on lower level i, the step of encoding may also include keeping track of the next sibling node of said each node. In particular, for two nodes N and M in $L_i$ (level i), they may be deemed by the process to represent sibling nodes if they have the same parent (i.e. the same encoded parent value) and their own node values are different (N!=M).

If this is the case, the next sibling is determined to be in a higher row than the previous sibling, where next sibling is determined in order of row (e.g. if M is at row 2 and N is at row 4, and the criteria above is satisfied, then N is the next sibling of M). If there are no next siblings, then the next sibling value is set as 0. This next sibling value may be determined for both the second column and third column of the source table, 301*b*, and 301*c*, using the above criteria.

For example, for the column 301*b*, the encoded parent value of both row numbers 0 and 1 is 0 (Level11 was encoded as 0). This is shown, for instance, in the first two rows of Encoded LevelCol1 303*b*. However, the LevelCol2 301*b* values are the same "Level21." Thus, the node though rows 0 and 1 have the same encoded parent value for the second column, and their node values in the second column are the same and thus cannot be different. Therefore row 1 cannot be the next sibling of row 0.

However, row 2, which also has the same encoded parent value of the first row 0 in the column Encoded Level Col1 (where the value is 0) may be classified as the next sibling node of the second column of row number 0, because the node values (Level21 and Level22 respectively) are different. Thus the next sibling of the node in the second column of row 0 of the source table may be the node in the second column of row 2 of the source table. Furthermore, the next sibling of the node in the second column of row 1 of the source table may also be the node in the second column of row 2 of the source table, because the node in the second column of row 0 and row 1 have the same value as shown in source table 301.

This result may be reflected in the Encoded Col2 Siblings 305 table, where as shown for the encoded LevelCol2 value of 0 (for rows 0 and 1) the next sibling may be in row 2. Through similar analysis, the next sibling node for the Encoded LevelCol2 value of 1 (row 2 as shown in 303*a* of Encoded Table 303) is 0 because there are no next sibling nodes present. Further, the next sibling node for the Encoded LevelCol2 value of 2 (row 3 as shown in 303*a* of Encoded Table 303) is row number 4, since row 4 has the same encoded value of the parent (1) and a different node value (Level22 as shown in source table 301). This process is then complete for all rows of Encoded Table 303 as described, and the result is shown in the table Encoded Col 2 Siblings 305. Then in a similar manner, the values of the encoded Col 2 in 303c are used along with the original source table values in 301c, and the row numbers of the next siblings for column 3 may be determined, resulting in Encoded Col 3 Siblings 307.

After the standard encoding format has thus been generated in step 209, a hierarchy is generated from this standard encoded format in step 211. This generation occurs according to the flowchart present in FIG. 4, and will be explained below in detail. The result of the hierarchy generation results in a structure that consists of an ordered list of nodes, from which a tree can easily be displayed, searched, and navigated. The nodes are represented by a minimal set of orthogonal hierarchy topology attributes plus a projection of the original source attributes.

The hierarchy representing such a structure may be displayed in step 213. For example, the generation step in 211 may help to translate the encoded source table and sibling node information to an ordered list of nodes such that the hierarchy in FIG. 7, which represents the source table, may be easily represented for each subtree 701, 703, and 705. These may, for example, be displayed in the tree display and input portion 609 of the GUI 600.

Once displayed, a user may input a node (e.g. city Berlin, street Beverly Hills Boulevard, etc.) under the filter display input 607 input field, which may be a text box, drop down, or the like. Based upon said field, the user may click the filter button 603, whereby the hierarchy may be easily traversed to find all nodes under a certain node to be filtered.

Tree traversal using an ordered list may use recursive searching techniques that can easily locate the node of concern. Such techniques may include binary searching, and the like. Further, once located, the nodes under that node in the tree structure can be read out to meet the display of the filter criteria. For example, if Berlin, Germany is the filtered input entry in field 607, wherein Level 22 in subtree 701 represents Berlin and Level 11 represents Germany, this can be found in comparison to another Berlin (Level 22), which may be part of another subtree 703, wherein Level 12 may be the state of Philadelphia, and together Level 22 in subtree 703 represents the city of Berlin, Philadelphia. In this manner confusion is avoided, and the entries under Level 22 in the subtree 701 (Level 33 is shown e.g. in FIG. 7) may be accessed and displayed as the filter results on the tree display and input 609. In this manner, the efficiencies of the hierarchy structure may be exploited to provide a fast user-experience and smooth operation for traversal and user navigation of the tree.

Figure 7:
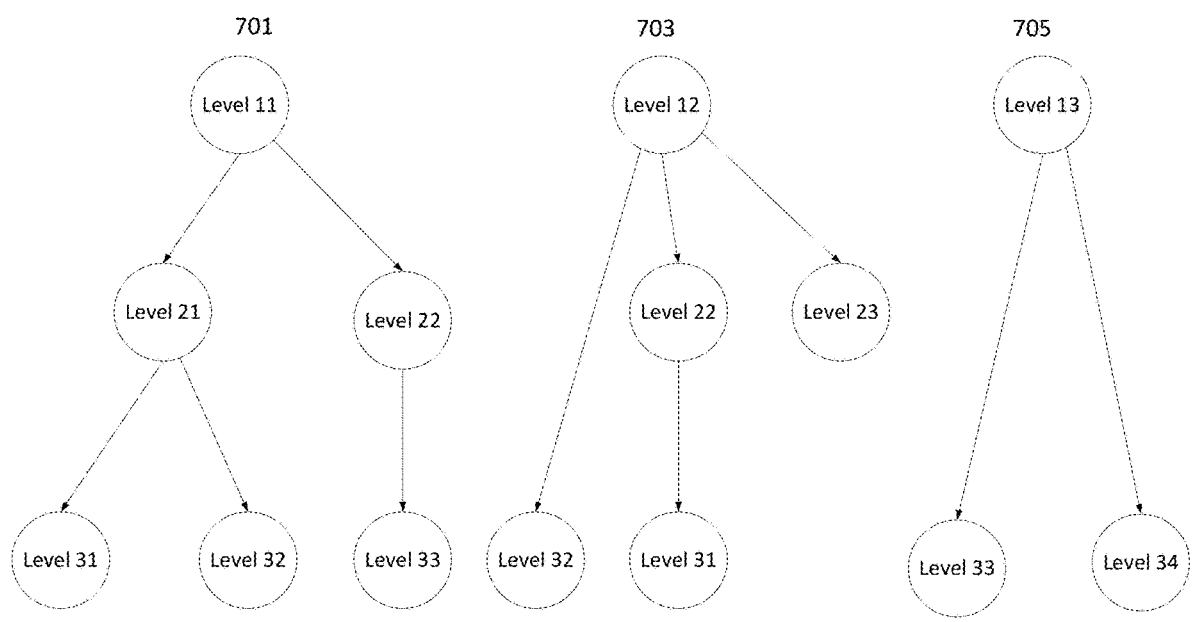
FIG. 7 shows an example hierarchy generated from the source table of FIG. 3, according to the process shown in FIG. 4, according to some embodiments.

Additional embodiments could be contemplated. For example, the user may be able to select specific nodes in the tree itself (such as wherein three subtrees as shown in FIG. 7 may be displayed in area 609 of the GUI if the source table is submitted as the input data 601, after the steps shown in FIG. 2 have run). After the user selects such a node, it may be shown highlighted in a color (e.g. yellow), and information about the node may be displayed, such as how many nodes lie under it. Additionally, by clicking on a node in the tree a filter display input may automatically be run to display all nodes under the user-selected node. In an additional embodiment, display of nodes may be sorted alphabetically by the user by clicking the ascending-to-descending sort button 605 on GUI 600.

Figure 5:
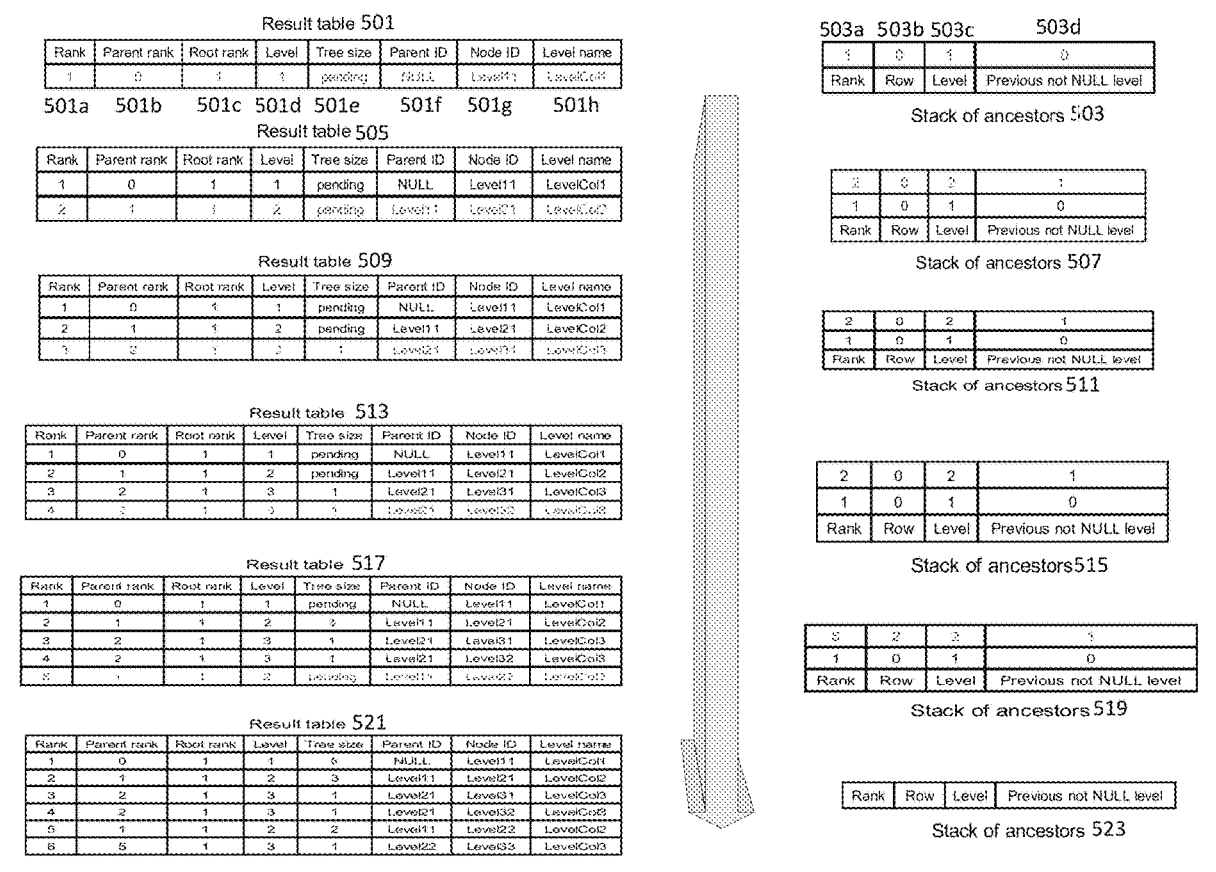

The process of the hierarchy generation in step 211 will now be explained in more detail with regards to the flowchart of FIG. 4 and the example tables in FIG. 5. The flowchart of FIG. 4 illustrates a depth-first search by preorder rank in generation of the hierarchy at step 211 of FIG. 2, from the encoded tables shown in FIG. 3 generated at step 209 of FIG. 2.

In step 401 of the process shown in FIG. 4, trees are sorted in the order in which they appear in the source (a tree appearing in an earlier row is sorted earlier), wherein as described above it is known which rows contain root nodes from the dictionary established in step 209. Two variables are used. The variable next_rank in step 401 keeps track of the next free rank, wherein for each tree, each node is eventually given a preorder rank, which is an integer value starting with one and incremented by one for each new node. The ancestors_stack, which keeps track of visited nodes along the current path, is also initially set to a null value in step 401.

Next, in step 403, all trees are checked to see if they have been traversed. In the case of source table 301, as step 211 is initially entered, from the dictionary it is known that root nodes are in rows 0, 3, and 6. Thus initially, all trees are not traversed ("NO" at step 403), and the process proceeds to 405, where a variable current_row is set as the first row of the tree, and current_level may be set to 1, indicating that the position in the table 301 as shown in FIG. 3 is at the upper leftmost (first row, first level/column).

Next, the process at step 407 checks to see if the entry at the current row and level is not null. If it is not null, as is the case in the upper leftmost corner of the source table 301 (value is Level11), then a new entry is created in the results table. In this new entry, as shown in step 409, the rank is set as the variable next_rank, and the variable next_rank is incremented by one. The value of the Hierarchy_level is set to level column corresponding to the current node (1, 2, 3, etc.). The value of the Level_name variable may be the name of the level column corresponding to the current node (e.g., in a geographical hierarchy different levels may be country, state, district, city, stree, number, etc., as columns of a source table, and thus represent levels or tiers of a geographical entry). The value of the Node_id is set as the value of the source table at the current_level and current_row. It is to be pointed out that the Node_id column is taken from the level column corresponding to the current node, and is not necessarily unique across the hierarchy (as pointed out above, a city Berlin may be in Germany as well as Philadelphia, and in this case just the node with the value 'Berlin' would not be unique).

Next in step 411, the generator function for generating a hierarchy determines if a parent node of the current node, whose node ID is determined in 409, exists. If a parent does not exist ("NO" at step 411), then the process proceeds to step 413. In step 413, the parent_rank variable is set as 0, the root_rank is set equal to the rank (1 so far), and the parent_id is set to NULL. In the case with the value of the first column of the first row of table 301, as can be seen in FIG. 3, a parent of this node indeed does not exist (which is why the value of parent_id is set to NULL), where the parent_rank is set to 0 and the root rank is set to the rank of the root node at the first column of the first row (1). Accordingly, as shown in the example results table 501 for this node in FIG. 5, the rank 501a, parent rank 501b, root rank 501c, level 501d, tree size 501e, parent ID 501f, Node ID 501g, and level name 501h variables are described. So far, steps 401-411 have described the result of all variables except 501e. The tree size is calculated at steps 419 or 423, and until it is calculated it appears as "pending" such as shown in results table 501. These columns will allow subsequent generic use of the hierarchy result without knowledge of the generator function.

Still in step 411, if the case was such that a parent node of the entry in 409 did exist, then in step 415 the parent_rank variable for this entry would have been set to the actual rank of the parent node, and the root_rank would have been set to the root_rank of the parent (where e.g. if the parent's root rank is 1, then the child's root rank would also be one, and this would also be transferred to a further child node of the child, and so on). Finally the parent_id instead of being set to null, would be set to the actual id of the parent.

Next, regardless of whether the process proceeds to 415 or 413 from step 411, both steps feed into the next step 417, which determines if the current_level is the leaf level (bottom-most level). In the current example with the leftmost entry of table 301, the current_level (1) is not the leaf level (the leaf-level as can be seen from the source table 301 is 3). Thus, the result is "NO" for step 417, and the process proceeds to step 429.

Then at step 429, the current new entry (the upper leftmost in table 301 in the example of FIG. 3) is pushed onto a stack of ancestors. This is shown in table 503, where the stack of ancestors appears with the entry with rank 503*a* of 1 (from 501*a*), row 503*b* 0 (which reflects the current_row variable at the time the entry was pushed), level 503*c* 1 (which reflects the current_level variable at the time the entry was pushed), and previous not NULL level 503*d* of 0 (reflecting the parent rank 501*b*). Then, still at step 429, the current_level (1) is then incremented, and becomes 2. The process goes back at this point to step 407, and is at the node at row 0, column 2 in source table 301. At 407, the process checks to see if the entry at the at the current row (0) and the current level (2) is NULL. It is not null (the value is Level21, making the decision "NO" at step 407). Thus the process proceeds through steps 409, 411, 415, 417, and again 429 in a similar manner to the first entry, with the only change being at step 415, wherein the parent_rank would be the rank of the parent (1), root_rank would be the parent's root_rank (1), and the parent_id would be the node_id of the parent (Level11). The entry is added to the results table as shown in results table 505, and, as with the first entry, is then pushed to the stack of ancestors per step 429, as shown in table 507 of FIG. 5, with the current level being incremented from 2 to 3.

Again, at step 407, the entry at row 0 and level 3 is not found to be NULL, so steps 409, 411, 415, and 417 occur again. However, at this time, unlike the first two entries, for the node at row 0 and level 3, the current level is the leaf level, so the process follows "YES" at step 417 and proceeds to step 419. Here in 419, the tree size of the node at the current row (0) and level (3) is set to 1. The ancestors stack remains as shown in table 511. Next, per step 419, the sibling nodes are visited utilizing the links that were established in step 209 above, in e.g. table Encoded Col 3 Siblings 307. Here, we can see that the next sibling for the encoded third column in the first row (row 0) is in row 1. Thus we set the current_row as 1, and visit the linked sibling, adding an entry in 409. The rank of the linked sibling is set as 4. The node_id, level_name, hierarchy_level, and parent_id, parent_rank, and root_rank are all set as described in steps 409-415 above, and the results table subsequently looks like that of table 513 in FIG. 5. Here we can see as a sibling node of the rank 3 entry, the parent_rank, root_rank, level, parent_id, and level_name are all the same. Here, again referring back to the table 307, at step 419 it is evident there are no further siblings to visit at this level.

Thus, the process continues to step 421, where the stack of ancestors looks like table 515. The ancestors_stack is not empty ("NO" at step 421), so the process continues to step 423. Here the top entry from the stack (that of the node corresponding to the first row and second level) may be popped, and if not null (which it is not), the tree size is updated to the next_rank-node.rank. Here next_rank is 5, and the node popped from the stack has rank 2, therefore the tree size is 3.

The process then continues to step 425, to see if the popped entry has a next sibling. Based on the sibling links established in step 209, as present in table 305 in FIG. 3, the next sibling of the node corresponding to the first row (row 0) and second level is on row number 2. Per step 427, the current_row value is set to the sibling row value (2), and the current_level is set to the sibling's current_level (2).

At step 407, the entry has a value (Level22) which is not NULL, so steps 409, 411, 415, and 417 are carried out again. In step 409, the rank 5 for the sibling (wherein next_rank is incremented to 6), and the node_id, level_name, hierarchy_level, parent_rank, root_rank, and parent_id, are added to the results table and set as seen in the last entry of table 517. Then, at step 417, the current level (2) is not the leaf level ("NO" at step 417), so the process proceeds to push the new entry onto the stack, and increment the current level from 2 to 3. The stack of ancestors then looks as present in 519, wherein the sibling at row 2 and level 2, with one previous not null level (level 1) is added to the stack.

Then, at the second row and third level, the entry (Level33) is not null ("NO" at step 407), so the process of steps 409, 411, 415, and 417 are redone for the node at the second row and third level in the source table 301. Here, the rank is 6, with next_rank being incremented to 7 in step 409. The Node_id, level_name, hierarchy_level, parent_rank, root_rank, and parent_id are all as shown in the last entry of the results table 521. Then, at 417, the table size is set to 1. Table 307 is re-evaluated to determine if there are any further sibling links present. However, for column 2 there are no further siblings present.

Thus the process continues to step 421, where the ancestors_stack (looking like table 519) is not empty ("NO" at step 421). Thus the top entry of the node at row 2, level 2 may be popped off. The tree size of this node is set to 2, since the next_rank is 7 and the rank of the node is 5, and the tree size corresponds to next_rank-node.rank. Further, table 305 is examined to determine if any further sibling links are present. There are no more sibling links present for row 2 (which has an EncodedLevelCol2 value of 1) as seen in table 305. Thus, the table result yields "NO" to step 425, meaning that step 421 is revisited. Here, there is still one entry left in the stack which is the bottom entry in table 519 of the root node, at row 0 and level 1. This final entry in the ancestors_stack is then popped at step 423. The tree size here, with next_rank still at 7, is set to 6, because the rank of the root node is 1 and tree size is set to next_rank-node.rank. The root node does not have any other siblings ("NO" to step 425), meaning that step 421 is revisited again. Here, too, the ancestors_stack is now empty, as seen in table 523 ("NO" at step 421). Therefore, the process has now finished for the first subtree, and now goes back to step 403 to check if all trees have been traversed. The same process is conducted in an analogous manner for the second and third subtree. In the end, tables comprising an ordered list, such as result table 521 which is generated for the first subtree, are also generated for the second and third subtrees. From such an ordered list, because the parent ID, Node ID, and level_names are all given, it is possible to generate an annotated hierarchy as shown in FIG. 7, which may then be displayed to the user as described above in the GUI 600, and can be further manipulated in step 213 of FIG. 2.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
    executing, by one or more computing devices, a collection routine on a source data repository, the source data repository comprising at least one data table in a level-based format, to gather raw data from each such table in the source data repository;
    receiving, by the one or more computing devices, results of the collection routine in a form of the raw data from the source data repository, which may be stored in a central data repository, by the at least one processor;
    generating, by the one or more computing devices, an encoded data table including encoded values corresponding to each of a plurality of values of the raw data, divided in the encoded data table based on one or more columns, wherein each value of the plurality of values that is the same shares the same encoded value;
    generating, by the one or more computing devices, one or more sibling data tables for each of the one or more columns, wherein each sibling data table of the one or more sibling data tables includes each distinct encoded value from the encoded data table corresponding to a respective column of the one or more columns and an encoded value of a sibling of each of the distinct encoded values;
    generating, by the one or more computing devices, an annotated tree hierarchy through a generator function run on the encoded data table and the one or more sibling data tables;
    generating, by the one or more computing devices, a graphic user interface (GUI) visually representing the annotated tree hierarchy; and
    displaying, by the one or more computing devices, the GUI.

2. The method of claim 1, wherein the at least one data table in the level-based format comprises records, wherein each of the records contains a complete individual path from a highest root node level to a lowest leaf level.

3. The method of claim 1, wherein the at least one data table in the level-based format comprises records having a plurality of columns, each of the columns comprising a different level, wherein different levels may be of a variety of data types.

4. The method of claim 3, to wherein generating the encoded data table comprising:
    mapping, by the one or more computing devices; external identifiers to data entries of a top level column by using a dictionary for encoding the top level column;
    mapping, by the one or more computing devices, external identifiers to data entries of lower level columns by values of the lower level columns along with an encoded parent value for uniqueness; and
    for each level of the at least one data table, tracking, by the one or more computing devices, a next sibling node for each node of each level.

5. The method of claim 4, wherein the keeping track of the next sibling node for each node of each level comprises:
    marking, by the one or more computing devices, two nodes as representing sibling nodes if they have the same encoded parent value, and values of the two nodes are different.

6. The method of claim 1, wherein the generating the annotated tree hierarchy comprises:
    performing, by the one or more computing devices, a depth-first pre-ranking order assessment of the encoded data table based on a stack of ancestor data.

7. The method of claim 1, wherein the generating the annotated tree hierarchy comprises:
    calculating, by the one or more computing devices, a number of nodes in a tree rooted at a current node for every data node present in the at least one data table.

8. A system, comprising:
    a memory; and
    at least one processor coupled to the memory and configured to:
    execute a collection routine on a source data repository, the source data repository comprising at least one data table in a level-based format, to gather raw data from each such table in the source data repository, which may be stored in a central data repository;

generate an encoded data table including encoded values corresponding to each of a plurality of values of the raw data, divided in the encoded data table based on one or more columns, wherein each value of the plurality of values that is the same shares the same encoded value;

generate one or more sibling data tables for each of the one or more columns, wherein each sibling data table of the one or more sibling data tables includes each distinct encoded value from the encoded data table corresponding to a respective column of the one or more columns and an encoded value of a sibling of each of the distinct encoded values;

generate an annotated tree hierarchy through a generator function run on the encoded data table and the one or more sibling data tables;

execute commands to generate a graphic user interface (GUI) visually representing the annotated tree hierarchy; and display the GUI.

9. The system of claim 8, wherein the at least one data table in the level-based format comprises records, wherein each of the records contains a complete individual path from a highest root node level to a lowest leaf level.

10. The system of claim 8, wherein the at least one data table in the level-based format comprises records having a plurality of columns, each of the columns comprising a different level, wherein different levels may be of a variety of data types.

11. The system of claim 10, wherein to generate the encoded data table, the at least one processor is further configured to:

map external identifiers to data entries of a top level column by using a dictionary for encoding the top level column;

map external identifiers to data entries of lower level columns by values of the lower level columns along with an encoded parent value for uniqueness; and for each level of the at least one data table, track a next sibling node for each node of each level.

12. The system of claim 11, wherein to keep track of the next sibling node for each node of each level, the at least one processor is configured to:

mark two nodes as representing sibling nodes if they have the same encoded parent value, and values of the two nodes are different.

13. The system of claim 8, wherein to generate the annotated tree hierarchy, the at least one processor is configured to:

perform a depth-first pre-ranking order assessment of the encoded data table based on a stack of ancestor data.

14. A non-transitory computer-readable device having instructions stored thereon that, when executed by at least one computing device, cause the at least one computing device to perform operations comprising:

executing a collection routine on a source data repository, the source data repository comprising at least one data table in a level-based format, to gather raw data from each such table in the source data repository;

receiving results of the collection routine in a form of the raw data from the source data repository, which may be stored in a central data repository;

generating an encoded data table including encoded values corresponding to each of a plurality of values of the raw data, divided in the encoded data table based on one or more columns, wherein each value of the plurality of values that is the same shares the same encoded value;

generating one or more sibling data tables for each of the one or more columns, wherein each sibling data table of the one or more sibling data tables includes each distinct encoded value from the encoded data table corresponding to a respective column of the one or more columns and an encoded value of a sibling of each of the distinct encoded values;

generating an annotated tree hierarchy through a generator function run on the encoded data table and the one or more sibling data tables;

executing commands to generate a graphic user interface (GUI), visually representing the annotated tree hierarchy; and displaying the GUI.

15. The non-transitory computer-readable device of claim 14, wherein the at least one data table in the level-based format comprises records, wherein each of the records contains a complete individual path from a highest root node level to a lowest leaf level.

16. The non-transitory computer-readable device of claim 14, wherein the at least one data table in the level-based format comprises records having a plurality of columns, each of the columns comprising a different level, wherein different levels may be of a variety of data types.

17. The non-transitory computer-readable device of claim 16, the operations for generating the encoded data table comprising:

mapping external identifiers to data entries of a top level column by using a dictionary for encoding the top level column;

mapping external identifiers to data entries of lower level columns by values of the lower level columns along with an encoded parent value for uniqueness; and for each level of the at least one data table, tracking a next sibling node for each node of each level.

18. The non-transitory computer-readable device of claim 17, the operations for keeping track of the next sibling node for each node of each level comprising:

marking two nodes as representing sibling nodes if they have the same encoded parent value, and values of the two nodes are different.

19. The non-transitory computer-readable device of claim 14, the operations for generating the annotated tree hierarchy comprising:

performing a depth-first pre-ranking order assessment of the encoded data table based on a stack of ancestor data.

20. The non-transitory computer-readable device of claim 14, the operations for generating the annotated tree hierarchy comprising:

calculating a number of nodes in a tree rooted at a current node for every data node present in the at least one data table.

* * * * *